United States Patent
Ota et al.

[11] Patent Number: 5,819,880
[45] Date of Patent: Oct. 13, 1998

[54] BICYCLE BRAKE SHOE HOLDER

[75] Inventors: Katsuyuki Ota; Tsutomu Muraoka, both of Sakai, Japan

[73] Assignee: Shimano, Inc., Osaka, Japan

[21] Appl. No.: 811,593

[22] Filed: Mar. 4, 1997

[30] Foreign Application Priority Data

Apr. 2, 1996 [JP] Japan ................................. 8-079925

[51] Int. Cl.$^6$ .................................................. B62L 3/00
[52] U.S. Cl. .................................... 188/24.22; 188/250 G
[58] Field of Search ............................ 188/24.12, 24.13, 188/24.19, 24.21, 24.22, 2 D, 234, 237, 250 R, 250 B, 250 G

[56] References Cited

U.S. PATENT DOCUMENTS

| | | | |
|---|---|---|---|
| 4,230,208 | 10/1980 | Gale | 188/24.12 X |
| 4,441,592 | 4/1984 | Everett | 188/24.12 X |
| 4,823,918 | 4/1989 | Yoshigai | 188/24.19 |

FOREIGN PATENT DOCUMENTS

| | | | |
|---|---|---|---|
| 336192 | 3/1904 | France | 188/24.21 |
| 3805237 | 11/1988 | Germany | 188/24.22 |
| 50-26123 | 8/1975 | Japan . | |
| 54-165681 | 11/1979 | Japan . | |
| 1276561 | 6/1972 | United Kingdom | 188/24.12 |

*Primary Examiner*—Lee W. Young
*Attorney, Agent, or Firm*—James A. Deland

[57] ABSTRACT

A bicycle brake shoe holder includes a support component for supporting a brake shoe, wherein the brake shoe has a rim-contacting surface facing laterally inward. A tire guide component having a tire guide portion extends laterally outward, wherein the tire guide portion includes a tire guide surface formed at an inclined angle relative to the rim-contacting surface. A protrusion member is disposed on the tire guide component and faces laterally inward. The protrusion member preferably is formed from a material that is softer than the material forming the wheel rim.

20 Claims, 3 Drawing Sheets

BICYCLE BRAKE SHOE HOLDER

BACKGROUND OF THE INVENTION

The present invention is directed to bicycle brake devices and, more particularly, to bicycle brake shoe holders.

Among the shoe holders for caliper brakes used on road racing bicycles, a type that has tire guide components is known. These tire guide components are provided in order to guide the wheel through the brake arch when the wheel must be replaced due to the occurrence of a flat tire, damage to the rim, or the like during a road race, which allows the wheel to be set in the fork more quickly.

In the past, a tire guide component of this type extended integrally or separately from the portion of the shoe holder that supported the brake shoe in the wheel center direction. The tire guide component was bent in the middle so as to form a convex component on the rim side, thus resulting in a distal end that opened outward. When a tire guide component such as this is provided, the wheel is guided to the convex component merely by being inserted from the open distal end, and the wheel can be guided into the brake arch more easily.

Some bicycle wheel rims are made, for example, from a carbon fiber-reinforced resin for reduced air resistance. Such a rim is known as a deep rim, and it is used in road racing bicycles. With a deep rim, the thickness of the rim in the radial direction is greater than the thickness of the rim in the lateral direction, and the inner peripheral edge of the rim has a pointed cross sectional shape. If shoe holders having conventional tire guide components are used on a deep rim such as this, because there is a lateral surface to the rim that is further on the inner peripheral side than the portion where the brake shoes come into contact, the convex component of the tire guide component can sometimes come into contact with the rim lateral surface when the brake shoes wear down. If the shoe holders are made from a metal such as aluminum and are harder than the rim, then contact between the convex components and the rim lateral surfaces can scratch the rim lateral surfaces. If the rim is scratched and its strength compromised, it must be replaced. If, on the other hand, the shoe holders are made from a resin and are softer than the rim, then contact between the convex components and the rim will cause the convex components to wear down, and their function of guiding the wheel will be lost. In this case the entire shoe holder must be replaced, and the brakes (e.g., shoe position) must be readjusted. This brake adjustment is time-consuming and troublesome.

SUMMARY OF THE INVENTION

The present invention is directed to a bicycle brake holder which includes a tire guide component wherein the rim will not be scratched if there is contact between the tire guide component and the rim lateral surface, and wherein the tire guide component can be replaced when it wears down without the brakes having to be readjusted. In one embodiment of the present invention, a bicycle brake shoe holder includes a support component for supporting a brake shoe, wherein the brake shoe has a rim-contacting surface facing laterally inward. A tire guide component having a tire guide portion extends laterally outward, wherein the tire guide portion includes a tire guide surface formed at an inclined angle relative to the rim-contacting surface. A protrusion member is disposed on the tire guide component and faces laterally inward. The protrusion member preferably is formed from a material that is softer than the material forming the wheel rim.

In a more specific embodiment, the protrusion member is detachably fastened to the tire guide component. For example, the protrusion member may be screwed into the tire guide component so that the protrusion member may be easily removed and replaced, if necessary.

DETAILED DESCRIPTION OF THE EMBODIMENTS

Figure 1:
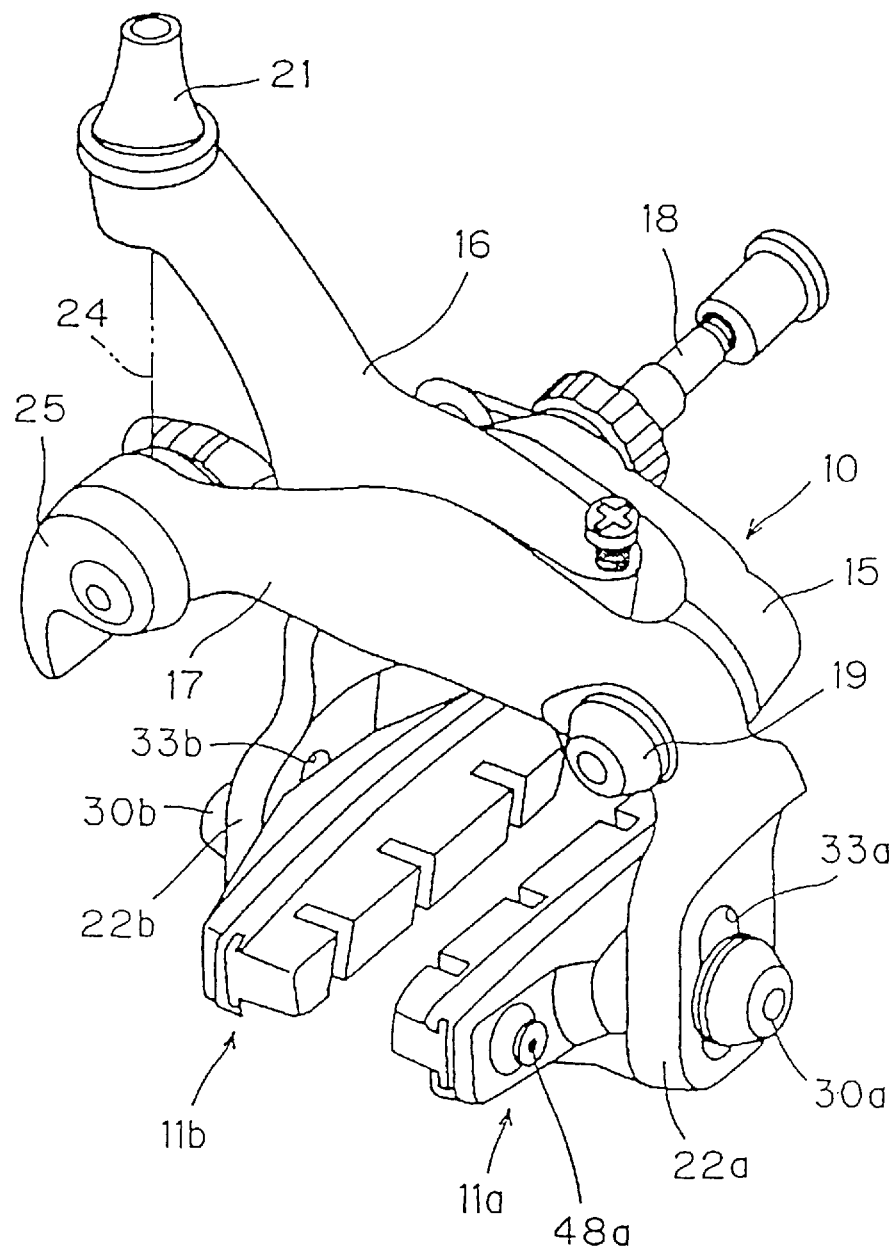
FIG. 1 is an oblique view of a bicycle caliper brake unit equipped with a particular embodiment of a brake shoe holder according to the present invention.
Figure 2:
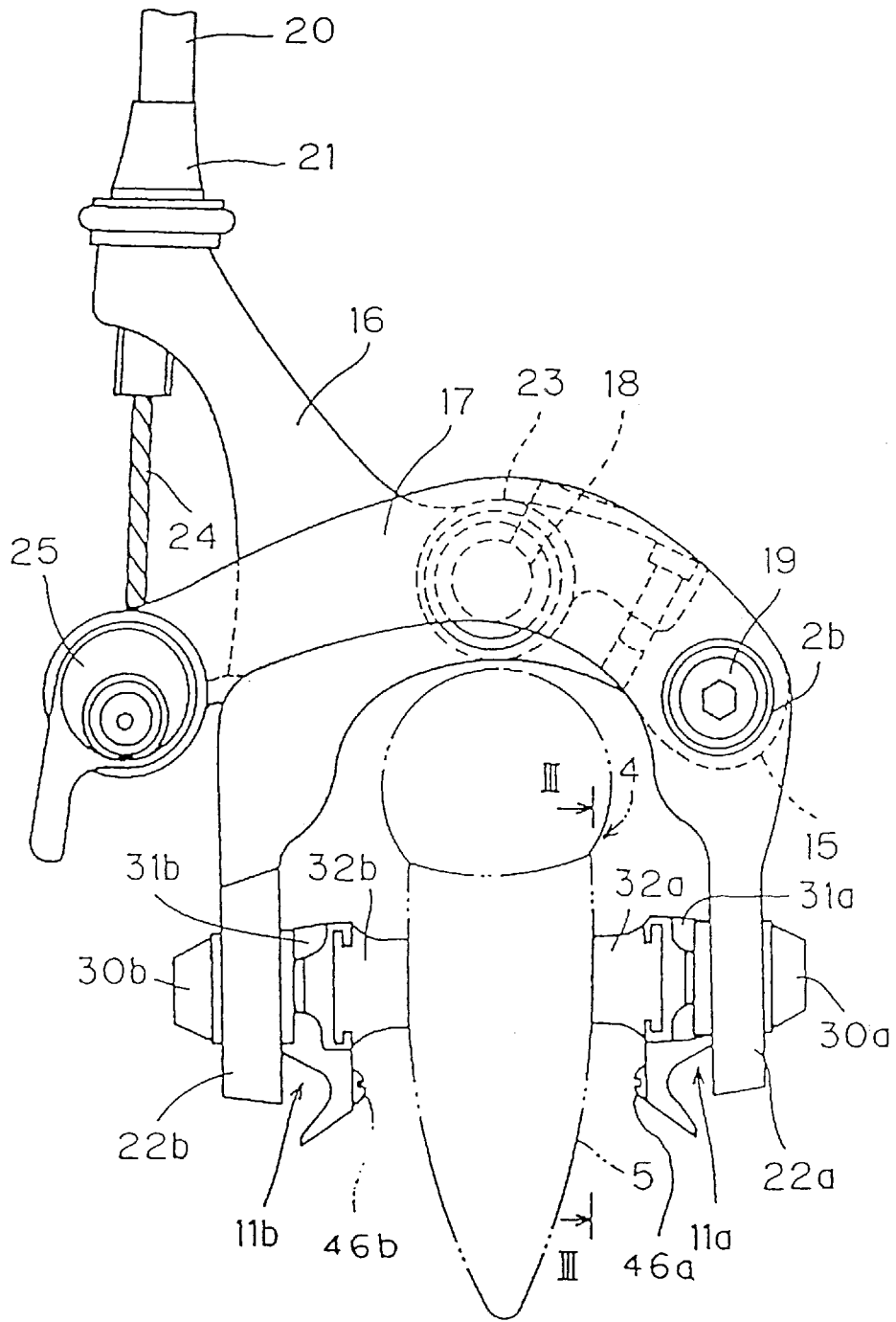
FIG. 2 is a front view of the caliper brake unit shown in FIG. 1.

FIG. 1 is an oblique view of a bicycle caliper brake unit equipped with a particular embodiment of a brake shoe holder according to the present invention, and FIG. 2 is a front view of the caliper brake unit shown in FIG. 1. As shown in FIGS. 1 and 2, the caliper brake unit has a brake arch 10, and a pair of left and right brake shoe assemblies 11a and 11b mounted on the distal ends of the brake arch 10. The brake arch 10 has a gate component 15, an inner brake arm 16 that is pivotably linked to the basal end of the gate component 15, and an outer brake arm 17 that is pivotably linked to the distal end of the gate component 15. With this caliper brake unit, unlike with an ordinary one, the two arms 16 and 17 pivot around different pivot centers, so a uniform and powerful force is obtained at the left and right brake shoes.

The gate component 15 is a rod-shaped member that is mounted at its basal end to the front fork or seat stay (not shown) by a mounting bolt 18. The inner brake arm 16 is pivotably supported by this mounting bolt 18. A support bolt 19 is threaded into the distal end of the gate component 15, and the outer brake arm 17 is pivotably supported by this support bolt 19.

The inner brake arm 16 is a Y-shaped member, the upper end of which is provided with a casing stopper 21 that stops the outer casing 20 of the brake cable. The lower end of the Y-shaped branch is provided with a holder mounting component 22b that is used to mount the right (the left side in FIG. 2) brake shoe assembly 11b. The other end of the Y-shaped branch is provided with the support component 23 of the mounting bolt 18.

The outer brake arm 17 is a C-shaped member, the lower end of which is provided with a holder mounting component 22a that is used to mount the left (the right side in FIG. 2) brake shoe assembly 11a. The other end is provided with a cable stopper 25 that is used to stop the distal end of the inner cable 24 of the brake cable. The support component 26 of the support bolt 19 is provided at the upper portion of the holder mounting component 22a of the outer brake arm 17. The two arms 16 and 17 are energized toward the brake release side (the direction in which the two arms open) by springs (not shown).

The pair of left and right brake shoe assemblies 11a and 11b are assembled in a mirror-image relationship, and they have holder mounting bolts 30a and 30b, shoe holders 31a and 31b, and brake shoes 32a and 32b that are detachably mounted to the shoe holders 31a and 31b. In the following description, only the members on the left side will be described, and the description of the members on the right side will be omitted.

Figure 3:
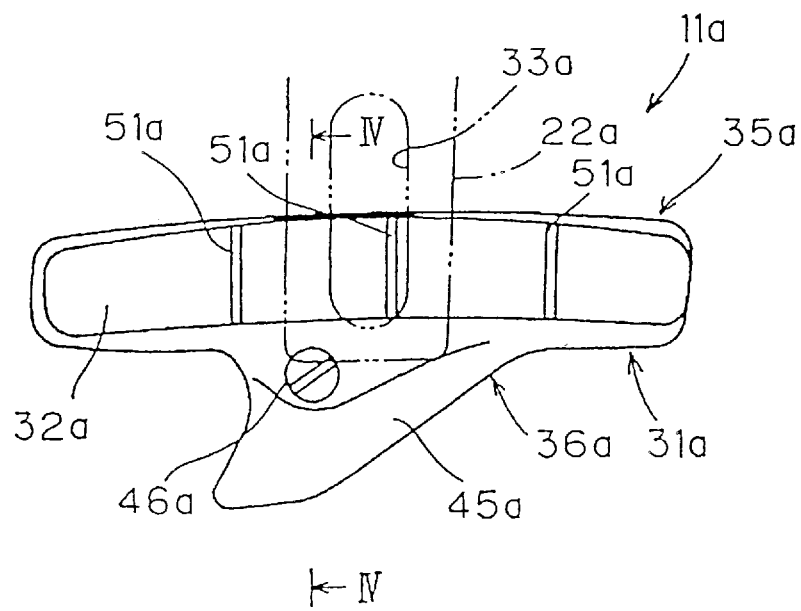
FIG. 3 is a view taken along line III—III in FIG. 2.
Figure 4:
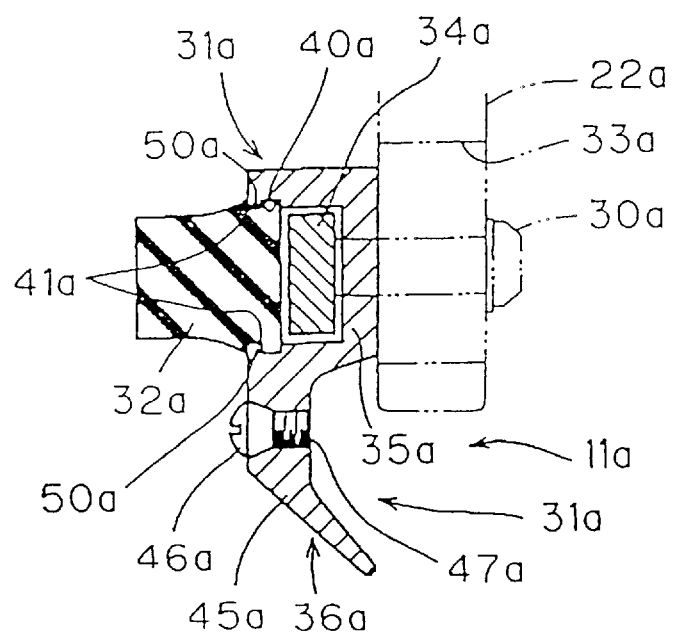
FIG. 4 is a view taken along line IV—IV in FIG. 3.

As shown in FIGS. 3 and 4, the holder mounting bolt 30a is passed through a slot 33a formed in the holder mounting component 22a. A flat stop nut 34a that is positioned inside the shoe holder 31a is threaded onto the holder mounting bolt 30a, which results in the mounting of the shoe holder 31a on the holder mounting component 22a. The shoe holder 31a is a member made from an aluminum alloy. Shoe holder 31a has a support component 35a that is used to support the brake shoe 32a, and a tire guide component 36a that extends downward (toward the wheel center) from the support component 35a. The support component 35a is a rod-shaped member that is longer in the peripheral direction of the rim 5 (FIG. 2), and it detachably supports the back side of the brake shoe 32a. A support groove 40a that is used to support the brake shoe 32a is formed on the lateral surface on the rim 5 side of the support component 35a. The support groove 40a is a groove formed along the peripheral direction of the rim 5, and vertically opposing protrusions 41a are formed at the opening thereof.

The tire guide component 36a is a member that guides the wheel 4 (FIG. 2) into the brake arch 10. The tire guide component 36a has a flat guide 45a that is integrally molded with the support component 35a, and a protrusion member 46a that is fastened by a screw to the rim 5-side lateral surface of the guide 45a. The distal end of the guide 45a extends from the support component 35a and away from the rim 5. The protrusion member 46a is a round-head screw made of acetal resin e.g. polyacetal resin (POM), for example, which is softer than the rim 5, and it is threaded into a screw hole 47a, which goes through the guide 45a, with its head sticking out from the lateral surface facing the rim.

The brake shoe 32a is a member made of rubber that extends in the peripheral direction of the rim 5, and on the upper and lower surfaces on the back side thereof are formed a pair of upper and lower grooves 50a that engage with the protrusions 41a of the support groove 40a formed in the support component 35a. These grooves 50a are aligned with the protrusions 41a, and the brake shoe 32a is slid into the support component 35a, which results in the mounting of the brake shoe 32a to the support component 35a. Also, three longitudinal grooves 51a are formed at some distance apart on the braking surface side. These vertical grooves 51a are formed in order to remove any water or other foreign matter that may adhere to the rim 5 and to remove abrasion dust. A stop screw 48a (FIG. 1) that is used to limit the longitudinal movement of the brake shoe 32a is attached to the support component 35a from the back surface side toward the back of the brake shoe 32a. A groove (not shown) which engages the distal end of this stop screw 48a is formed on the back of the brake shoe 32a.

With a caliper brake unit structured in this manner, when the inner cable 24 is pulled by means of the brake lever provided to the handlebar, the arms 16 and 17 swing toward the rim 5, the brake shoes 32a and 32b are pressed against the rim 5, and braking is thereby applied. When the brake lever is returned to its original position, the arms 16 and 17 are swung to the other side (the brake release side) by springs (not shown), and the braking is released.

After the brakes have thus been applied a number of times, the brake shoes 32a and 32b begin to wear down. When the brake shoes 32a and 32b wear down, if the rim 5 is a deep rim as shown in FIG. 2, then the distal ends of the protrusion members 46a and 46b come into contact with the lateral surfaces of the rim 5. However, if the rim 5 is made from a carbon fiber-reinforced resin, for example, it is not scratched since it is harder than an acetal resin. Therefore, the protrusion members 46a and 46b are worn down by their contact with the rim 5. When this wear reaches the point where the protrusion members 46a and 46b no longer guide the wheel 4 during wheel mounting, then the protrusion members 46a and 46b must be replaced. In the replacement of the protrusion members 46a and 46b, the worn protrusion members 46a and 46b are taken out from the screw holes 47a and 47b in the guides 45a and 45b, and the new protrusion members 46a and 46b are threaded into the screw holes 47a and 47b. In this case, there is no need to take off the shoe holders 31a and 31b, so replacement of the protrusion members 45a and 45b does not necessitate the readjustment of the brakes.

While the above is a description of various embodiments of the present invention, further modifications may be employed without departing from the spirit and scope of the present invention. For example, the present invention can also be applied to the shoe holder in a cantilever brake or another type of brake instead of a caliper brake, and the tire guide component may be provided separately from the shoe holder. The configuration of the protrusion members is not limited to round-head screws, and any configuration is possible as long as it sticks out of the guide toward the rim. Instead of a structure in which the brake shoe is detachably supported on the shoe holder, the brake shoe may be integrally supported such that it cannot be detached. The same is true of the protrusion member.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle brake shoe holder comprising:
   a support component for supporting a brake shoe, wherein the brake shoe has a rim-contacting surface facing laterally inward;
   a tire guide component having a tire guide portion extending laterally outward, wherein the tire guide portion includes a tire guide surface formed at an inclined angle relative to the rim-contacting surface; and
   a protrusion member separate from the brake shoe, disposed on the tire guide component, extending from and surrounded by a surface of the tire guide component, and having an exposed surface facing laterally inward and disposed laterally outward of the rim contacting surface of the brake shoe.

2. The brake shoe holder according to claim 1 wherein the support component detachably supports the brake shoe.

3. The brake shoe holder according to claim 1 wherein the support component integrally supports the brake shoe.

4. The brake shoe holder according to claim 1 wherein the protrusion member is screwed into the tire guide component.

5. The brake shoe holder according to claim 1 wherein the tire guide component is formed as one piece with the support component.

6. The brake shoe holder according to claim 1 wherein the tire guide component includes an intermediate component disposed between the brake shoe and the tire guide portion, and wherein the intermediate component is oriented substantially parallel to the rim-contacting surface.

7. The brake shoe holder according to claim 6 wherein the protrusion member is disposed at the intermediate component.

8. The brake shoe holder according to claim 1 wherein the protrusion member is formed from polyacetal resin (POM).

9. The brake shoe holder according to claim 1 wherein the protrusion member is detachably fastened to the tire guide component.

10. A bicycle brake device comprising:

a wheel rim;

a support component for supporting a brake shoe, wherein the brake shoe has a rim-contacting surface facing the wheel rim;

a tire guide component having a tire guide surface facing the wheel rim and extending laterally outward in a direction of a center of the wheel rim;

a protrusion member separate from the brake shoe, disposed on the tire guide component, extending from and surrounded by a surface of the tire guide component and having an exposed surface facing the wheel rim and disposed laterally outward of the rim contacting surface of the brake shoe; and wherein the protrusion member is formed from a material that is softer than material forming the wheel rim.

11. The brake device according to claim 10 wherein the support component detachably supports the brake shoe.

12. The brake device according to claim 10 wherein the support component integrally supports the brake shoe.

13. The brake device according to claim 10 wherein the protrusion member is screwed into the tire guide component.

14. The brake device according to claim 10 wherein the tire guide component is formed as one piece with the support component.

15. The brake device according to claim 10 wherein the tire guide component includes an intermediate component disposed between the brake shoe and the tire guide surface, and wherein the intermediate component is oriented substantially parallel to the rim-contacting surface.

16. The brake device according to claim 15 wherein the protrusion member is disposed at the intermediate component.

17. The brake device according to claim 10 wherein the protrusion member is formed from polyacetal resin (POM).

18. The brake device according to claim 10 wherein the protrusion member is detachably fastened to the tire guide component.

19. A bicycle brake shoe assembly comprising:

a brake shoe having a rim-contacting surface facing laterally inward;

a support component for supporting the brake shoe, wherein the support component has a support component surface facing laterally inward and parallel to the rim-contacting surface of the brake shoe;

a protrusion member separate from the brake shoe and disposed on the support component surface; and wherein the protrusion member has an exposed surface facing laterally inward and disposed laterally outward of the rim contacting surface of the brake shoe.

20. The brake shoe assembly according to claim 19 wherein the protrusion member comprises a screw having a head that forms the exposed surface.

* * * * *